United States Patent [19]

Yoshioka et al.

[11] 4,140,654
[45] Feb. 20, 1979

[54] CATALYST COMPOSITION WITH SUPPORT COMPRISING TITANIUM OXIDE AND CLAY MINERAL FOR VAPOR PHASE REDUCTION OF NITROGEN OXIDES

[75] Inventors: Toshihiro Yoshioka; Shikiho Itaya, both of Ohtake; Yusaku Arima, Onga; Hirokazu Tanaka, Kitakyushu, all of Japan

[73] Assignees: Mitsui Petrochemical Industries Ltd.; Catalysts & Chemicals Industries Co. Ltd., both of Tokyo, Japan

[21] Appl. No.: 786,825

[22] Filed: Apr. 12, 1977

[30] Foreign Application Priority Data

Apr. 16, 1976 [JP] Japan ................... 51-42576
Nov. 27, 1976 [JP] Japan ................... 51-141777

[51] Int. Cl.$^2$ .................. B01J 27/02; B01J 21/16; B01J 21/06; B01J 8/00
[52] U.S. Cl. .................. 252/440; 252/455 R; 423/239
[58] Field of Search .................. 252/440, 455 R, 454; 423/239 A, 213.2

[56] References Cited

U.S. PATENT DOCUMENTS

| | | | |
|---|---|---|---|
| 2,862,875 | 12/1958 | Morrell | 252/454 |
| 3,888,845 | 6/1975 | Fujita et al. | 252/454 |
| 3,928,238 | 12/1975 | Korberstein et al. | 252/455 R |
| 3,948,807 | 4/1976 | Fuchigami et al. | 252/461 |
| 3,972,834 | 8/1976 | Washbourne | 252/455 R |
| 4,010,238 | 3/1977 | Shiraishi et al. | 423/239 A |
| 4,048,112 | 9/1977 | Matsushita et al. | 423/213.2 |

*Primary Examiner*—Winston A. Douglas
*Assistant Examiner*—P. E. Konopka
*Attorney, Agent, or Firm*—Sherman & Shalloway

[57] ABSTRACT

A catalyst composition for the vapor phase reduction of nitrogen oxides with ammonia, which consists essentially of a non-noble transition metal compound supported on a shaped carrier comprising a titanium oxide and a clay mineral having an average particle size of 0.1 to 100 microns. The shaped carrier preferably contains an additional component which is an inorganic fibrous material, silica hydrogel, silica sol, or a mixture of at least two of these. An exhaust gas containing nitrogen oxides is treated, with a high percent NO removal, by contacting it with the catalyst composition in the presence of ammonia gas at 200 to 600° C.

17 Claims, No Drawings

CATALYST COMPOSITION WITH SUPPORT COMPRISING TITANIUM OXIDE AND CLAY MINERAL FOR VAPOR PHASE REDUCTION OF NITROGEN OXIDES

This invention relates to a process for the catalytic vapor phase reduction of nitrogen oxides to nitrogen and water, and to an improved catalyst composition which retains high catalytic activity stably over long periods of time, has superior strength that can withstand a destructive force exerted during its handling and use, and can catalyze the reduction of nitrogen oxides contained in waste and exhaust gases to harmless nitrogen and water with marked industrial advantage.

The catalyst composition of the invention retains its high catalytic activity and superior resistance to poisoning for long periods of time in the reduction of nitrogen oxides. It has moldability into any desired shape. The molded catalyst composition has high physical strength sufficient to withstand the physical destructive force exerted on it during its handling and transportation, and its use in various operations such as charging into a reducing zone or reducing treatment. The catalyst composition also permits the decrease of pressure drop and maintains a low pressure drop over long periods. Moreover, the low cost of the catalyst composition adds to the industrial advantages of the process of this invention.

Nitrogen oxides (mainly denoting NO and $NO_2$; generically called "nitrogen oxides" in the present application) are contained in waste and exhaust gases of various sources, such as boiler exhausts and motor vehicle exhausts. They are toxic to the humans, and are considered to be substances which will cause air pollution in the form of, say, photo-chemical smog, affecting not only the workers of industrial establishments but also the general public. This is a serious social problem, and needs to be solved by exploiting effective measures for removing nitrogen oxides from various exhaust and waste gases or converting them to harmless compounds.

A number of methods have heretofore been suggested in an attempt to meet this need. These prior methods can be divided roughly into a wet absorbing process by which nitrogen oxides are removed by causing them to be absorbed by, for example, an alkali aqueous solution or an aqueous solution of a bisulfite, and a dry catalytic reduction process by which nitrogen oxides are reduced using a catalyst. Of these methods, a gas-phase catalytic reduction method using ammonia is currently considered to be most advantageous for commercial operations. The present invention relates to a process for the vapor phase catalytic reduction of nitrogen oxides by this type of process, and to a catalyst composition used for it.

Reduction of nitrogen oxides by this type of process is performed by contacting an exhaust gas containing the nitrogen oxides with an ammonia gas at elevated temperatures in the presence of a catalyst, thereby to reduce the nitrogen oxides to harmless nitrogen and water, as schematically shown below.

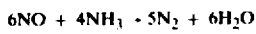

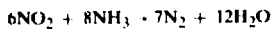

The reducing method using ammonia is called a selective reducing method because nitrogen oxides react with ammonia selectively to some extent even in the presence of oxygen. It has the advantage that the consumption of ammonia by oxygen present in exhaust gases can be inhibited.

Known catalysts for use in the vapor-phase catalytic reduction of nitrogen oxides of the above type include a catalyst comprising vanadium oxide or molybdenum oxide supported on alumina or silica gel (U.S. Pat. No. 3,279,884), a catalyst comprising an oxide of a transition metal (excepting noble metals), such as copper oxide, iron oxide, chromium oxide, cobalt oxide or nickel oxide, supported on alumina of a high surface area (Japanese Laid-Open Patent Publication No. 75464/74), and a catalyst comprising an oxide of a transition metal (excepting noble metals), such as vanadium oxide or cerium oxide, supported on titanium oxide (Japanese Laid-Open Patent Publications Nos. 51996/75 and 65467/75).

The catalyst comprising a transition metal oxide (excepting noble metal oxides), such as vanadium oxide, molybdenum oxide, copper oxide or iron oxide, supported on an ordinary carrier such as alumina or silica gel exhibits high catalytic activity in the early stage, but has the defect that it cannot retain its activity stably over long periods of time because it is poisoned by sulfur oxides (mainly denoting $SO_2$ and $SO_3$; generically called "sulfur oxides" in the present application) which are normally contained in nitrogen oxide-containing exhaust gases. The catalyst comprising a transition metal oxide (excepting noble metal oxides), such as vanadium oxide or cerium oxide, supported on titanium oxide has good catalytic activity and good resistance to poisoning by sulfur oxides. On the other hand, it has poor moldability into the desired shape, and poor physical strength with susceptibility to destruction by a physical destructive force exerted during its handling or use. Because of the low physical strength, this catalyst is subject to various troubles during use for long periods, and the restriction on its shape makes it difficult to reduce pressure drop and to maintain a low pressure drop for long periods of time.

The present inventors extensively worked in an attempt to provide a commercially satisfactory process for the catalytic vapor-phase reduction of nitrogen oxides and a catalyst composition for use in the process, which are free from the disadvantages and defects of the conventional catalysts described hereinabove. This led to the discovery that a catalyst composition consisting essentially of a non-noble transition metal compound supported on a shaped carrier comprising titanium oxide and a low-cost readily available clay mineral, preferably a clay mineral having an average particle size of 0.1 to 100 microns, retains high catalytic activity and superior resistance to poisoning in the reduction of nitrogen oxides over long periods of time. It was also found that the catalyst composition can be molded into various desired shapes, and has satisfactory physical strength sufficient for withstanding physical destruction during its handling or use. The inventors further found that these improvements can be enhanced by including an additional carrier component which is an inorganic fibrous material, silica hydrogel, silica sol, or a mixture of at least two of these.

It has been found that according to the present invention, a process for the catalytic vapor-phase reduction of nitrogen oxides and a catalyst composition for use in it can be provided which achieve many improvements and advantages, such as high catalytic activity in reduction, superior resistance to poisoning, retention of these properties for long periods of time, superior moldability, high physical strength, the ability to permit the decrease of pressure drop during a reducing operation, maintenance of a low pressure drop over long periods of time, increased activity per unit weight of catalyst, the prevention of the masking of catalyst surface and blockage of the catalyst layer due to dust present in waste gases to be treated, and continued stability of treatment.

Accordingly, it is an object of this invention to provide a process for catalytically reducing nitrogen oxides which can achieve marked improvements.

Another object of this invention is to provide an improved catalyst composition suitable for use in the above process.

The above and other objects and advantages of the present invention will become apparent from the following description.

The catalyst composition of this invention consists essentially of a non-noble transition metal compound supported on a shaped carrier comprising a titanium oxide and a clay mineral having an average particle size of 0.1 to 100 microns. Preferably, the catalyst composition consists essentially of a non-noble transition metal compound supported on a shaped carrier composed of a titanium oxide, a clay mineral having an average particle size of 0.1 to 100 microns, and an additional component which is an inorganic fibrous material, silica hydrogel, silica sol or a mixture of at least two of these species.

The term "non-noble transition metal", as used in the present application, denotes transition metals excepting noble metals.

The titanium oxide used in the present invention is a term which denotes hydrous titanium oxides, such as ortho-titanic acid or meta-titanic acid, obtained by hydrolyzing titanium salts such as titanium chloride or titanium sulfate, and titanium oxides obtained by drying these hydrous titanium oxides at room temperature to 1,000° C. It includes oxides of titanium such as titanium (II) oxide (titanium monoxide, TiO), titanium (III) oxide (titanium sesquioxide, $Ti_2O_3$), titanium (IV) oxide (titanium dioxide, $TiO_2$), ortho-titanic acid ($\alpha$-titanic acid), and meta-titanic acid ($\beta$-titanic acid), and mixtures of these.

Examples of the clay mineral used in the present invention are montmorillonite-type clay minerals such as montmorillonite, bentonite, acid terra alba, activated clay or fuller's earth; kaolin-type clay minerals such as German kaolinite (occurring in west Germany), kibushi-clay (occurring in Aichi, Japan), Gaerome clay (occurring in Aichi, Japan), Georgia kaolin, and kaolinite; halloysite-type clay minerals such as halloysite or hydrated halloysite; pyrophyllite-type clay minerals such as agalmatolite or pyrophyllite; sericite-type clay minerals such as Murakami clay (occurring in Niigata, Japan); and mixtures of these clay minerals in optional combinations.

For good moldability and physical strength of the resulting catalyst composition, the clay mineral preferably has an average particle size of 0.1 to 100 microns.

The non-noble transition metal compound used in this invention includes, for example, the oxides or sulfates of metals selected from metals of Groups IB, VIB, VB, VIIB and VIII of the periodic table and cerium. Oxides of metals selected from copper, vanadium, chromium, molybdenum, tungsten, manganese, iron and cerium are especially preferred. These compounds can be used either alone or in admixture of two or more.

The oxidation number of the metal oxide is not restricted in particular, and oxides of any oxidation number are feasible. Specific examples of suitable non-noble transition metal compounds are vanadium pentoxide ($V_2O_5$), vanadium dioxide ($VO_2$), vanadium trioxide ($V_2O_3$), cupric oxide (CuO), ferric oxide ($Fe_2O_3$), ferroferric oxide ($Fe_3O_4$), molybdenum trioxide ($MoO_3$), tungsten dioxide ($WO_2$), and tungsten trioxide ($WO_3$).

A preferred catalyst composition of this invention comprises 0.1 to 20% by weight, preferably 0.5 to 15% by weight, of the non-noble transition metal compound, 1 to 60% by weight, preferably 5 to 20% by weight, of the clay mineral, and 20 to 90% by weight, preferably 70 to 90% by weight, of the titanium oxide, all proportions being based on the weight of the catalyst composition. In an especially preferred form of the catalyst composition of this invention, the shaped carrier further includes a component selected from an inorganic fibrous material, silica hydrogel, silica sol, and a mixture of at least two of these species. The amount of the additional carrier component is 0.5 to 25% by weight based on the total weight of the titanium oxide and the clay mineral.

Suitable proportions of the ingredients of the catalyst composition of this invention are, for example, as follows:

| | |
|---|---|
| Titanium oxide | 60 to 95% by weight |
| Clay mineral | 5 to 30% by weight |
| Additional carrier component | 3 to 10% by weight |
| Non-noble transition metal compound | 3 to 15% by weight |

The inorganic fibrous material as the other carrier component may be inorganic fibrous materials of natural origin and artificial or synthetic origin. Examples of the inorganic fibrous material are glass wool, glass fibers, rock wool, Kaowool (registered trademark), asbestos, and mixtures of at least two of these. Preferably, the inorganic fibrous material has a fiber length of 0.01 to 200 mm and a fiber diameter of not more than about 1 mm. It is especially preferred that the fiber length be at least about 10 times the fiber diameter.

The silica hydrogel or silica sol as the additional carrier component is preferably in the form of fine particles having an average particle size of not more than 10 m$\mu$, for example, 0.1 to 10 m$\mu$, in order to increase the thermal stability of the catalyst.

The silica hydrogel and silica sol, as used in the invention, contain at least 50% by weight of a silica component, and may embrace a hydrogel or sol of silica-alumina or silica-magnesia containing at least 50% by weight of a silica component.

The catalyst composition of this invention should preferably be in the form of hollow cylinder. The catalyst composition of this invention which includes the additional carrier component described above is especially preferred for fabrication into a hollow cylindrical shape because it can be molded into any desired shape and has superior physical strength. The previously suggested catalysts consisting of a non-noble transition metal compound supported on a titanium oxide carrier cannot be fabricated into such a shape because of its poor moldability and low physical strength, and catalysts feasible for practical purposes cannot be obtained.

The cross-sectional shape of the hollow cylindrical carrier of the catalyst composition of this invention is preferably circular or nearly circular. Generally, the catalyst pellets have such a shape as will permit minimization of the areas of contact between the pellets when they are packed in a reducing zone with their axes of cylinder aligned in one direction, namely such a shape as will allow sufficient spaces among the cylindrical pellets, and for example, they may have a polygonal (e.g., heptagonal or more) cross-sectional shape. It should be understood that these shapes are also included within the term "cylindrical" as referred to in the present application.

It is especially preferred that the pellets of the catalyst composition of this invention molded into a hollow cylindrical shape especially preferably have an inside diameter of 5 to 40 mm, especially 15 to 40 mm, and an outside diameter-to-inside diameter ratio of from 1.2 to 1.6. The height of each cylinder is preferably at least about 100 mm, for example, 100 to 3,000, more preferably 200 to 1,000 mm.

With conventional catalyst compositions used to reduce nitrogen oxides with ammonia in the vapor phase, attempts are made to minimize the particle diameter of the catalyst pellets in order to increase the apparent surface area of the catalyst composition per unit weight thereof. Thus, these catalyst compositions are generally used in the form of small spheres, tablets or cylindrical pellets each having a diameter and a height of 5 to 10 mm. When a catalyst of such a shape is used as packed in a fixed bed reactor, dust normally contained in a fairly large amount in nitrogen oxide-containing waste gases tends to cause the masking of the catalyst surface or the blockage of the catalyst-packed layer. In order to avoid these disadvantages, it has been the previous practice to modify the reactor itself by using complicated and expensive means in designing and production. In contrast, the present invention can afford a catalyst composition having superior catalytic activity and being of a cylindrical shape as a result of marked improvement in moldability and physical strength. The aforesaid masking or blocking troubles can be easily avoided just by packing the catalyst composition into a reactor in such a manner that the axes of the hollow cylindrical pellets are aligned in the direction of gas flow. There is no need to subject the reactor to the complicated and expensive modification.

The catalyst composition of this invention in the form of hollow cylindrical pellets of the suitable sizes described above is especially preferred because it conveniently avoids the aforementioned troubles, and exhibits superior catalytic activity and resistance to poisoning over long periods of time in addition to having a good efficiency of contact with gases and high physical strength, and permitting the decrease of pressure drop.

The catalyst composition of this invention can be prepared, for example, by mixing an aqueous solution of a water-soluble salt of a non-noble transition metal, such as nitrates, carbonates, oxalates or ammonium salts, the titanium oxide, and the clay mineral with or without the additional carrier component described hereinabove, shaping the mixture into the desired shape (for example, by extrusion molding), drying the molded mixture, and calcining it. Alternatively, it can be prepared by first preparing a shaped carrier by kneading the titanium oxide and clay mineral with or without the additional carrier component in the presence of a small amount of water, molding the mixture into the desired shape (for example, by extrusion molding), drying the molded mixture and calcining it; impregnating the shaped carrier with an aqueous solution of the water-soluble salt of the transition metal; drying it at 20 to 100° C. for 10 to 50 hours; and calcining the dried product. Calcination can be performed, for example, at a temperature of at least about 100° C., usually 300 to 700° C. In the catalyst preparing method described, a dissolving or mixing aid such as monoethanolamine may be added at the time of kneading the individual components of the catalyst or starting materials for these components.

The shape of the catalyst can be a sphere, tablet, cylinder, ring, or honeycomb. Preferably, the catalyst composition, as stated hereinabove, is in the form of hollow cylindrical pellets having a fairly large size.

According to the present invention, there can be provided a process for the catalytic vapor-phase reduction of nitrogen oxides contained in a waste gas, which comprises contacting said waste gas with a catalyst composition in the presence of ammonia gas at a temperature of 200 to 600° C., said catalyst composition consisting essentially of a non-noble transition metal compound supported on a shaped carrier composed of a titanium oxide and a clay mineral having an average particle size of 0.1 to 100 microns, preferably together with an additional carrier component selected from the group consisting of an inorganic fibrous material, silica hydrogel, silica sol, and a mixture of at least two of these species.

The catalytic vapor-phase reduction of the nitrogen oxide-containing waste gas can be performed by introducing a gaseous mixture of it with 0.5 to 5 moles, preferably 1 to 2 moles, per stoichiometrically required mole of the nitrogen oxides to be removed through a reaction zone packed with the catalyst composition. Alternatively, this can be performed by introducing the nitrogen oxide-containing waste gas and ammonia simultaneously from separate openings through the catalyst layer. Any of moving bed, fluidized bed and fixed bed can be used in the reaction, but the use of a fixed bed-system is preferred.

The reaction temperature somewhat differs according to the proportions of the ingredients of the catalyst composition. The suitable reaction temperature is generally 200 to 600° C., preferably 250 to 450° C.

When the reaction is carried out at a temperature exceeding 600° C., part of ammonia as a reducing agent tends to react with oxygen present in the exhaust gas to form nitrogen oxides. On the other hand, if the reaction temperature is lower than 200° C., there is a tendency to the formation of ammonium nitrate or ammonium nitrite, and in the presence of $SO_2$, sulfates or sulfites tends to be formed, or NO and $NO_2$ cannot be reduced to nitrogen and nitrogen suboxide ($N_2O$) is formed as a by-product. Hence, temperatures outside the specified range are undesirable.

The reaction time, which is expressed in terms of space velocity, differs according to the proportions of the catalyst ingredients. Usually, the space velocity is 1,000 to 100,000 $Nm^3$, preferably 5,000 to 30,000 $Nm^3$, per hour per $m^3$ of catalyst.

The reaction pressure may be atmospheric, reduced or elevated pressures.

In a preferred embodiment of the present invention in which hollow cylindrical catalyst pellets are used, it is preferred to arrange the catalyst pellets regularly in a catalytic reaction zone so that the axes of the hollow cylindrical pellets correspond substantially with the direction of the flow of the feed gas in the reaction zone. Specifically, the catalyst pellets may be arranged in a square shape or diamond shape, etc. In this manner of arrangement, it is desirable to stack the catalyst pellets coaxially to a suitable thickness. As a result, not only the inside surfaces of the hollow portions of the catalyst pellets, but also their outside surfaces can be effectively utilized. The packing of the hollow cylindrical catalyst pellets can be performed by a close contact method in which they are arranged so that their outside surfaces contact one another partly, or by a sparse packing method in which they are arranged with suitable spaces along them to avoid contact. The latter method of arrangement can be practised, for example, by extending lead wires within a reactor to support the catalyst pellets properly; or by supporting them by any other suitable supports.

According to the process of this invention, a high ratio of nitrogen oxide removal can be maintained for very long periods of time even when reducing nitrogen oxides in a waste gas, such as a boiler exhaust gas, consisting of 100 to 1,000 ppm of nitrogen oxides (mainly NO), 200 to 2,000 ppm of sulfur oxides (mainly $SO_2$), 1 to 8% by volume of oxygen, 5 to 20% by volume of $CO_2$, and 5 to 20% by volume of steam in the presence of ammonia. In the treatment of waste gases containing large quantities of dusts, for example, boiler exhaust gases, the use of hollow cylindrical catalysts of this invention can advantageously avoid masking or blocking of the catalyst layer, and the catalysts can be used over long periods of time. Hence, the present invention is of great commercial significance.

The following examples illustrate the present invention in greater detail. It should be understood that the invention is not limited to these examples.

The mechanical strength of the catalyst is expressed in terms of pressure resistant strength which is measured by the following method. The catalyst is compression-molded (compression ratio 24) into cylindrical pellets each having a diameter of 5 mm and a height of 3.8 mm. The destruction strength of each of the cylindrical pellets is measured by a Kiya-type hardness tester. When the catalyst is in the form of hollow cylindrical pellets, they are cut so that the length of each pellet in the direction of its hollow axis equals the outside diameter of its cross-section, and the destruction strength of each hollow cylindrical catalyst pellet in its diametrical direction is measured by a Kiya-type hardness tester.

EXAMPLES 1 TO 10 AND COMPARATIVE EXAMPLES 1 TO 13

A mixture of 93.6 g of titanium oxide and active clay having a particle diameter of 0.1 to 10 microns was thoroughly kneaded with 80 ml of an aqueous solution containing 15 g of ammonium metavanadate and 13 g of monoethanolamine, and the mixture was extrusion molded into cylindrical pellets having a diameter of 5 mm and a height of 5 mm. The pellets were dried, and then calcined in air at 500° C. for 3 hours within a muffle furnace. Thus, a catalyst consisting of 10% by weight, as $V_2O_5$, of vanadium, 10% by weight of active clay and 90% by weight of $TiO_2$ was prepared. The pressure resistant strength of this catalyst was measured, and the results are shown in Table 1 below.

The catalyst so prepared was packed in an amount of 2 liters into a reaction tube having an inside diameter of 10 cm and a height of 50 cm, and a mixture consisting of 300 ppm of ammonia and a gas simulating a typical boiler exhaust gas, i.e. a gas consisting of 300 ppm of NO, 300 ppm of $SO_2$, 15% by volume of $CO_2$, 12% by volume of $H_2O$, and the remainder being $N_2$, was passed through the catalyst layer at a temperature of 350° C. and a space velocity of 30,000 $hr^{-1}$. The NO removal ratio at this time is shown in Table 1. The NO removal ratio was also determined after continuing this reactiobn for 500 hours, and the results are also shown in Table 1.

Various catalyst compositions were prepared in the same manner as described above except that the active catalyst ingredient and the clay mineral were changed as indicated in Table 1. The proportions of the catalyst ingredients, the pressure resistant strengths of the catalysts, and the NO removal ratios of these catalysts in the same reaction as above are shown in Table 1.

Table 1 also shows the results of comparative tests in which the clay mineral was not used, and those in which a $\gamma$-alumina or silica hydrogel carrier was used instead of $TiO_2$.

Table 1

| Example (EX.) or Comparative Example (CE.) | Composition of catalyst (% by weight) | | | | | | Strength of the catalyst (kg) | NO removal ratio (%) | |
|---|---|---|---|---|---|---|---|---|---|
| | Active ingredient | | $TiO_2$ wt. % | Clay mineral | | | | Initial | After 500 hours |
| | Type | wt. % | | Type | Size ($\mu$) | wt. % | | | |
| EX. 1 | $V_2O_5$ | 10 | 80 | Active clay | 0.1–10 | 10 | 18.8 | 91 | 91 |
| CE. 1 | $V_2O_5$ | 10 | 90 | — | — | — | 3.3 | 90 | 88 |
| EX. 2 | $V_2O_5$ | 10 | 74 | Bentonite | 0.1–10 | 15 | 9.5 | 90 | 89 |
| CE. 2 | " | 10 | 90 | — | — | — | 3.3 | 90 | 88 |
| EX. 3 | $Cr_2O_3$ | 7 | 83 | Acid terra alba | 0.1–10 | 10 | 11.7 | 91 | 87 |
| CE. 3 | " | 10 | 90 | — | — | — | 3.2 | 90 | 85 |
| EX. 4 | $Fe_2O_3$ | 10 | 40 | Active clay | 0.1–10 | 50 | 28.6 | 88 | 83 |
| CE. 4 | " | 10 | 90 | — | — | — | 3.8 | 87 | 82 |
| EX. 5 | $Fe_2O_3$ | 5 | 85 | Kaolin | 0.2–20 | 10 | 10.1 | 89 | 87 |
| CE. 5 | " | 10 | 90 | — | — | — | 3.8 | 87 | 82 |
| EX. 6 | $MoO_3$ | 15 | 80 | Montmorillonite | 0.1–3 | 5 | 9.0 | 88 | 87 |
| CE. 6 | " | 10 | 90 | — | — | — | 3.1 | 88 | 85 |
| EX. 7 | CeO | 10 | 70 | Bentonite | 0.1–10 | 20 | 14.3 | 88 | 86 |
| CE. 7 | " | 10 | 90 | — | — | — | 3.6 | 88 | 84 |
| Ex. 8 | $V_2O_5$ | 10 | 75 | Kaolin (occurring in Shipaha) | 0.1–2 | 15 | 22.5 | 91 | 89 |
| CE. 8 | " | 10 | 90 | — | — | — | 3.3 | 90 | 88 |
| EX. 9 | $V_2O_5$ | 8 | 72 | Kaolin (occurring in Shipaha) Gaerome clay | 0.1–2 5–100 | 15 5 | 27.8 | 90 | 89 |
| CE. 9 | " | 10 | 90 | — | — | — | 3.3 | 90 | 88 |
| EX. 10 | $V_2O_5$ | 10 | 75 | Active clay | 0.1–10 | 15 | 19.5 | 91 | 91 |
| CE. 10 | " | 10 | $\gamma$-alumina | — | — | — | 15.2 | 52 | 31 |

Table 1-continued

| Example (EX.) or Comparative Example (CE.) | Composition of catalyst (% by weight) | | | | | | Strength of the catalyst (kg) | NO removal ratio (%) | |
|---|---|---|---|---|---|---|---|---|---|
| | Active ingredient | | $TiO_2$ wt. % | Clay mineral | | | | | |
| | Type | wt. % | | Type | Size ($\mu$) | wt. % | | Initial | After 500 hours |
| CE. 11 | " | 10 | 90 Silica hydrogel | — | — | — | 1.6 | 13 | 12 |
| CE. 12 | " | 10 | 90 $\gamma$-alumina | — | — | — | 3.3 | 90 | 88 |
| CE. 13 | " | 10 | 90 $TiO_2$ (60) (30) | — | — | — | 8.4 | 74 | 67 |

EXAMPLE 11

A 100-liter stainless steel kneader equipped with a steam jacket was charged with 60 kg of meta-titanic acid containing 30% of titanium oxide, and with stirring, the pH of the material was adjusted to 8.5 with a 15% aqueous solution of ammonia.

Separately, 2.75 kg of ammonium meatvanadate was dissolved in 25 kg of hot water to form a solution having a concentration of about 10%.

The neutralized metal-titanic acid was stirred, and mixed with ammonium metavanadate. Then, 3.75 kg of kaolin having a particle size of 0.1 to 2 microns (occurring in Shipaha) and 1.25 kg of glass fibers (Nittobo Glass Fiber Chopped Strands, CS-3E-221) were added, and sufficiently mixed with the solution. The resulting slurry was heated, masticated, concentrated to a water content suitable for fabrication, and then molded by an extruder into pellets having a diameter of 5.0 mm and a length of 5.0 to 6.0 mm.

The pellets were dried overnight at 110° C., and calcined in the air at 400° C. for 3 hours. The pressure resistant strength of the catalyst and its NO removal ratio in the same reaction as in Example 1 were determined, and the results are shown in Table 2. Table 2 also contains the data for Example 9 for easy reference.

The neutralized metal-titanic acid was stirred and mixed with ammonium metavanadate. Then, 3.75 kg of kaolin occurring in Shipaha and having a particle diameter of 0.1 to 2 microns and 1.25 kg of glass fibers (Glass fiber chopped strands, CS-3E-221; a product of Nittobo, Japan) were added to the mixture, and they were thoroughly mixed. The slurry was heated, masticated, and concentrated to water content suitable for molding. The mixture was then molded by an extruder into hollow cylindrical pellets each having an outside diameter of 33.0 mm, an inside diameter of 23.0 mm and a height of 300 mm. The strength of this catalyst was measured by the method described hereinabove, and its strength in the diametrical direction is shown in Table 3.

Eighty-one cylindrical catalyst pellets obtained were packed into a reactor in a square shape in intimate contact with one another, and stacked concentrically to a height of 2.7 m (9 layers). A gaseous mixture of a boiler exhaust gas composed of 230 ppm of NO, 800 ppm of $SO_2$, 12% by volume of $CO_2$, 10% by volume of $H_2O$ and the remainder being $N_2$ and containing 150 mg/$Nm^3$ dry of dust with 230 ppm of ammonia was passed into the reactor at a space velocity of 5,000 $hr^{-1}$ and a temperature of 350° C.

The NO removal, the liquid velocity (L.V.) and the pressure drop at this time are shown in Table 3.

Table 2

| | | | Example 9 | Example 11 |
|---|---|---|---|---|
| Catalyst ingredients | Active ingredients | Type % by weight | $V_2O_5$ 8 | $V_2O_5$ 8 |
| | $TiO_2$ (wt. %) | | 72 | 72 |
| | Clay (A) | Type | Kaolin occurring in Shipaha | Kaolin occurring in Shipaha |
| | | Particle size ($\mu$) | 0.1-2 | 0.1-2 |
| | | % by weight | 15 | 15 |
| | Clay (B) | Type | Gaeorome clay | — |
| | | Particle size ($\mu$) | 5-100 | — |
| | | % by weight | 5 | — |
| | Glass fibers (% by weight) | | — | 5 |
| Pressure resistant strength (kg) | | | 27.8 | 35.4 |
| NO removal ratio (%) | Initial | | 90 | 90 |
| | After 500 hours | | 89 | 90 |

EXAMPLES 12 AND 13 AND COMPARATIVE EXAMPLES 13 TO 14

A 100-liter stainless steel kneader equipped with a steam jacket was charged with 60 kg of meta-titanic acid containing 30% of titanium oxide, and with stirring, the pH of the material was adjusted to 8.5 with a 15% aqueous solution of ammonia.

Separately, 2.75 kg of ammonium metavanadate was dissolved in 25 kg of hot water to form a solution having a concentration of about 10%.

For comparison, a $V_2O_5$-$TiO_2$-glass fiber catalyst was prepared by the same method as in the preparation of catalyst in Example 13 except that the clay was not used. The catalyst was molded into hollow cylindrical pellets each having an inside diameter of 23 mm, an outside diameter of 33 mm, and a height of 300 mm. These cylindrical pellets were packed closely in a reactor in the same way as in Example 13, and quite the same reaction as in Example 13 was performed. The strength of the hollow cylindrical catalyst, the NO removal ratio, the liquid velocity (L.V.), and the pressure drop are shown in Table 3.

Table 3

| Example (EX.) or Comparative Example (CE.) | Catalyst ingredients (% by weight) | | | | Strength of catalyst (diameter) (kg) | L.V. (m/sec.) | S.V. (hr$^{-1}$) | NO removal ratio (%) | | Pressure drop (mm Aq) | |
|---|---|---|---|---|---|---|---|---|---|---|---|
| | $V_2O_5$ | $TiO_2$ | Clay | Glass fiber | | | | Initial | After 500 hours | Initial | After 500 hours |
| Ex. 12 | 8 | 72 | 15 | 5 | 10 | 86 | 5,000 | 92 | 92 | 80 | 80 |
| CE. 13 | 9 | 81 | 0 | 10 | 4 | 86 | 5,000 | 92 | 92 | 80 | 80 |
| Ex. 13 | 8 | 77 | 15 | 0 | 6 | 86 | 5,000 | 92 | 92 | 80 | 80 |
| CE. 14 | 8 | 92 | 0 | 0 | 1 | 86 | 5,000 | 91 | 89 | 80 | 100 |

EXAMPLES 14 AND 15

The procedure of Example 12 was repeated except that the composition of the catalyst was changed as shown in Table 4. The results obtained are shown in Table 4.

EXAMPLE 16

A catalyst was prepared in the same way as in Example 12 except that a hydrogen containing silica with a size of 2.51 mµ was further added as an additional carrier component. Using this catalyst, the same reaction as in Example 12 was performed except that the reaction temperature was changed to 420° C. The results are shown in Table 4.

Table 4

| Example | Composition of the catalyst (% by weight) | | | | | | Strength of Catalyst (kg) | NO removal ratio (%) | |
|---|---|---|---|---|---|---|---|---|---|
| | Type and amount (wt. %) of active ingredient | Amount of $TiO_2$ (wt. %) | Clay mineral | | Additional carrier component | | | | |
| | | | Type and amount (wt. %) | Size (µ) | Type and amount (wt. %) | Size (mµ) | | Initial | After 500 hours |
| 14 | $V_2O_5$ (8) | 72 | Kaolin occurring in Shipaha (15) | 0.1–2 | Asbestos (5) | — | 9.5 | 91 | 91 |
| 15 | $V_2O_5$ (8) | 72 | Kaolin occurring in Shipaha (15) | 0.1–2 | Rock wool* (5) | — | 9.5 | 91 | 91 |
| 16 | $V_2O_5$ (10) | 60 | Active clay (15) | 0.1–10 | Silica (10) Glass Fibers (5) | 2.51 — | 8.5 | 92 | 92 |

*ROCK FIBER 42, a product of Nittobo Co., Ltd.

What is claimed is:

1. A catalyst composition for use in the vapor phase reduction of nitrogen oxides with ammonia, said catalyst composition consisting essentially of a non-noble transition metal compound supported on a shaped carrier comprising a titanium oxide, a clay mineral having an average particle size of 0.1 to 100 microns and an additional component which is an inorganic fibrous material or a mixture of the fibrous material and at least one member selected from the group consisting of silica hydrogel and silica sol, wherein the clay mineral is selected from the group consisting of montmorillonite clay minerals, kaoline clay minerals, halloysite clay minerals, pyrophyllite clay minerals and sericite clay minerals and the catalyst composition contains 0.1 to 20% by weight of the non-noble transition metal compound, 1 to 60% by weight of the clay mineral, and 20 to 90% by weight of the titanium oxide, all based on the weight of the catalyst composition and 0.5 to 25% by weight of the additional component based on the total weight of the titanium oxide and clay mineral.

2. The catalyst composition of claim 1 wherein the non-noble transition metal compound is an oxide or sulfate of a metal selected from the group consisting of metals of Groups IB, VIB, VB, VIIB and VIII of the periodic table and cerium.

3. The catalyst composition of claim 1 wherein the non-noble transition metal compound is an oxide of a metal selected from the group consisting of copper, vanadium, chromium, molybdenum, tungsten, manganese, iron and cerium.

4. The catalyst composition of claim 1 wherein the inorganic fibrous material is selected from the group consisting of glass wool, glass fiber, rock wool, Kaowool and asbestos.

5. The catalyst composition of claim 1 wherein the additional component is the mixture of the fibrous material and at least one member selected from the group consisting of silica hydrogel and silica sol wherein the silica hydrogel and the silica sol have an average particle size of 0.1 to 10 mµ.

6. The catalyst composition of claim 5 wherein the silica hydrogel and silica sol each contain at least 50% by weight of a silica component.

7. The catalyst composition of claim 1 wherein the clay mineral is selected from the group consisting of montmorillonite, bentonite, acid terra alba, activated clay, fuller's earth, German kaolinite, kibushi-clay, Gaerome clay, Georgia kaolin, halloysite, hydrated halloysite, agalmatolite, pyrophyllite, and Murakami clay or mixtures thereof.

8. The catalyst composition of claim 1 wherein the non-noble transition metal compound is selected from the group consisting of vanadium pentoxide, vanadium dioxide, vanadium trioxide, cupric oxide, ferric oxide, ferroferric oxide, molybdenum, trioxide, tungsten dioxide, and tungsten trioxide.

9. The catalyst composition of claim 1 having the following proportions of the ingredients:

| Titanium oxide | 60 to 90% by weight |
|---|---|
| Clay mineral | 5 to 30% by weight |
| Additional component | 3 to 10% by weight |
| Non-noble transition metal compound | 3 to 15% by weight. |

10. The catalyst composition of claim 1 wherein the additional component is the inorganic fibrous material which is selected from the group consisting of glass wool, glass fiber, rock wool, Kaowool and asbestos.

11. The catalyst composition of claim 10 wherein the inorganic fibrous material has a fiber length of 0.01 to 200 mm and a fiber diameter of not more than about 1 mm.

12. The catalyst composition of claim 11 wherein the ratio of the length to diameter of the inorganic fibrous material is at least about 10:1.

13. The catalyst composition of claim 1 which is in the form of hollow cylindrical pellets.

14. The catalyst composition of claim 13 wherein each hollow cylindrical pellet has an inside diameter of 5 to 40 mm, and the ratio of its outside diameter to its inside diameter is from 1.2 to 1.6.

15. The catalyst composition of claim 14 wherein each hollow cylindrical pellet has an inside diameter of 15 to 40 mm.

16. The catalyst composition of claim 15 wherein the height of each hollow cylinder is between from about 100 to 3,000 mm.

17. The catalyst composition of claim 15 wherein the height of each hollow cylinder is from about 200 to 1,000 mm.

* * * * *